B. SCHOTTELIUS.
ELECTRIC LOCOMOTIVE.
APPLICATION FILED OCT. 21, 1913.
1,118,371.
Patented Nov. 24, 1914.
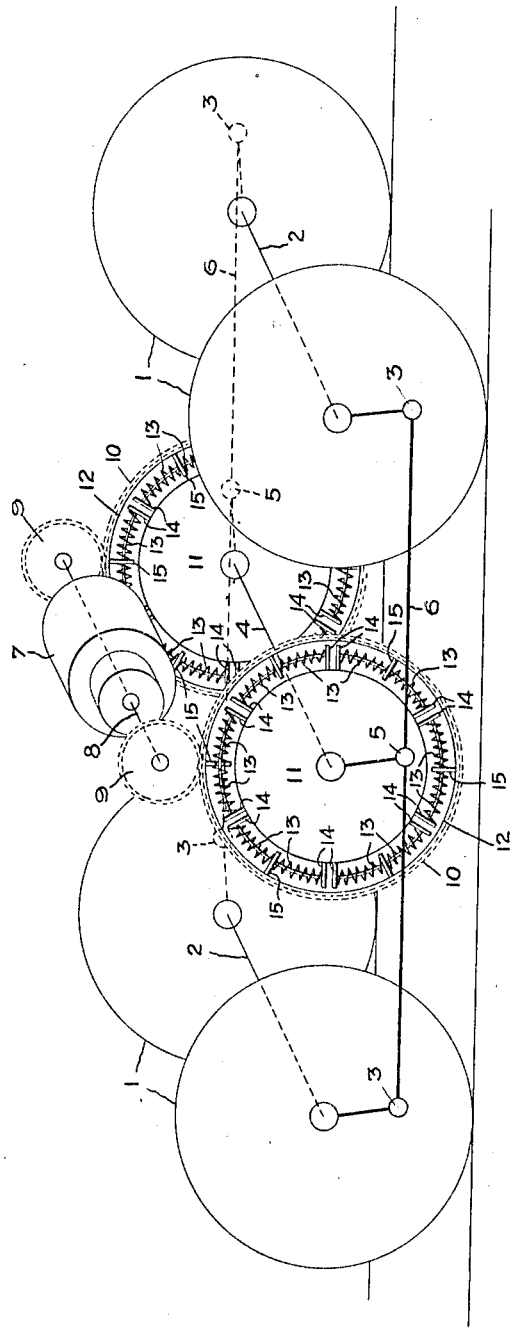
Witnesses:
Marcus L. Byng.
J. Ellis Glim
Inventor:
Bernhard Schottelius,
by
His Attorney.

UNITED STATES PATENT OFFICE.

BERNHARD SCHOTTELIUS, OF BERLIN, GERMANY, ASSIGNOR TO GENERAL ELECTRIC COMPANY, A CORPORATION OF NEW YORK.

ELECTRIC LOCOMOTIVE.

1,118,371.  Specification of Letters Patent.  Patented Nov. 24, 1914.

Application filed October 21, 1913. Serial No. 796,525.

*To all whom it may concern:*

Be it known that I, BERNHARD SCHOTTELIUS, a subject of the Emperor of Germany, residing at Berlin, Germany, have invented certain new and useful Improvements in Electric Locomotives, of which the following is a specification.

My invention relates to electric locomotives in which the transmission of power to the driving wheels is by means of an electric motor, driving pinions which mesh with gear wheels on a jack shaft, which in turn is connected to the driving wheels through cranks and side rods. As such locomotives have been constructed heretofore, the pressure between the teeth of the pinions and the teeth of the gears varies periodically during each revolution of the jack shaft, whereby the teeth wear unevenly and thus cause the gears and pinions to become useless in a short time. The variation in the pressure between the teeth of the gears and the teeth of the pinions is due to the fact that the forces in the side rods vary as the sine of the angle which the side rods make with the horizontal, each gear wheel transmitting power only to the side rod to which it is connected.

My invention has for its object the prevention of this variation in pressure between the teeth of the gear wheels and the teeth of the pinions and the consequent rapid wear of the teeth. To this end, I equalize the forces transmitted by the gears and pinions in a novel manner through the jack shaft.

The various features of novelty which characterize my invention are pointed out with particularity in the claims annexed to and forming a part of this specification. For a better understanding of my invention however, reference may be had to the following description taken in connection with the accompanying drawing in which the single figure shows diagrammatically one embodiment of my invention.

Referring to the drawing, 1 are driving wheels of an electric locomotive mounted on axles 2 and having crank pins 3. The crank pins on one side of the locomotive are preferably arranged with a ninety degree relation to the crank pins on the other side of the locomotive, as is clearly seen in the drawing. A jack shaft 4 is connected through crank pins 5 and side rods 6 with the driving wheels. An electric motor 7 having an armature shaft 8 extending across the locomotive drives pinions 9, which are shown as mounted on the ends of the armature shaft. These pinions in turn drive gear wheels 10 on the jack shaft 4. These gear wheels 10 are resiliently mounted on the jack shaft so that there is a yielding drive between them and the jack shaft. In the arrangement shown in the drawing the gear wheels 10 comprise central portions 11, on which the crank pins 5 are mounted and thus form cranks for driving the side rods, and a rim portion 12, which is resiliently connected to the central portion 11 by means of springs 13. The springs 13 are placed in position under an initial stress between projections 14 on the central portion of the gears and projections 15 on the rim portion of the gears. This stress may be either tension or compression. These springs may be supported in any well known manner. The initial stress, under which the springs 13 are placed, is such that the mean force transmitted by the central portions of the gears 10 will not cause the springs to yield. In the case where the cranks are arranged with a 90° relation, it is well known that when one crank is transmitting its maximum power the crank on the opposite side of the locomotive is transmitting its minimum power, and vice versa. With the resilient connection of the rim portion of the gears 10 with the central portion however, as soon as the force transmitted by one crank exceeds the mean, the springs 13 yield and force the gearing on the other side of the locomotive to furnish energy through the jack shaft, whereby both sets of gearing furnish power to drive the one crank on which the demand is greater than the mean. In this way, the pressure between the teeth of the pinions 9 and gears 10 never exceeds the mean requirement of energy. When the power requirement on one side of the locomotive falls below the mean value, then the excess of power is transmitted through the jack shaft to the other side of the locomotive. In this way it is possible to transmit power from a drive shaft by means of two gear trains with an equal loading of both trains, notwithstanding the fact that the power delivered by the cranks varies continuously. With my arrangement also, any irregularities in the teeth of the gear trains are compensated for.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is,—

1. An electric locomotive comprising driving wheels and axles, a transverse jack shaft, a gear wheel on each end of said jack shaft, means for resiliently mounting said gear wheels on said jack shaft, said means being under an initial stress of substantially the mean force transmitted by said jack shaft, cranks and side rods connecting said jack shaft with said wheels, two pinions, and an electric motor having an armature shaft extending across said locomotive and driving said pinions, each of said pinions meshing with each of said gear wheels.

2. An electric locomotive comprising driving wheels and axles, a transverse jack shaft, a gear wheel on each end of said jack shaft, each of said gear wheels comprising a central portion and a rim portion, resilient means connecting said portions of said gear wheels, crank pins on said wheels and said central portions of said gears, side rods connecting said crank pins, two pinions, and an electric motor having an armature shaft extending across said locomotive and driving two pinions, each of said pinions meshing with each of said rim portions of said gear wheels.

3. An electric locomotive comprising driving wheels and axles, a transverse jack shaft, a gear wheel on each end of said jack shaft, each of said gear wheels comprising a central portion and a rim portion, resilient means connecting said portions of said gear wheels, crank pins on said wheels and said central portions of said gears, said crank pins on one side of the locomotive being arranged with a ninety degree relation to the crank pins on the other side of the locomotive, side rods connecting said crank pins, two pinions, and an electric motor having an armature shaft extending across said locomotive and driving said pinions, each of said pinions meshing with each of said rim portions of said gear wheels.

4. In an electric locomotive comprising driving wheels and axles, a transverse jack shaft, a gear wheel on each end of said jack shaft, each of said gear wheels comprising a central portion and a rim portion, resilient means connecting said portions of said gear wheels, said means being under an initial stress of substantially the mean force transmitted by said central portions of said gears, crank pins on said wheels and said central portion of said gears, side rods connecting said crank pins, two pinions, and an electric motor having an armature shaft extending across said locomotive and driving said pinions, each of said pinions meshing with each of said rim portions of said gear wheels.

5. In an electric locomotive comprising driving wheels and axles, a transverse jack shaft, a gear wheel on each end of said jack shaft, each of said gear wheels comprising a central portion and a rim portion, resilient means connecting said portions of said gear wheels, said means being under an initial stress of substantially the mean force transmitted by said central portions of said gears, crank pins on said wheels and said central portions of said gears, said crank pins on one side of the locomotive being arranged with a ninety degree relation to the crank pins on the other side of the locomotive, side rods connecting said crank pins, two pinions, and an electric motor having an armature shaft extending across said locomotive and driving said pinions, each of said pinions meshing with each of said rim portions of said gear wheels.

In witness whereof, I have hereunto set my hand this 2 day of October, 1913.

BERNHARD SCHOTTELIUS.

Witnesses:
 JULIUS RÜMLAND,
 RICHARD DAVID.